United States Patent
Quarfoth et al.

(10) Patent No.: US 12,199,357 B1
(45) Date of Patent: Jan. 14, 2025

(54) SURFACE ANTENNA COMPENSATION

(71) Applicant: HRL LABORATORIES, LLC, Malibu, CA (US)

(72) Inventors: Ryan Quarfoth, Malibu, CA (US); Christopher Roper, Malibu, CA (US); Jacob Hundley, Malibu, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 332 days.

(21) Appl. No.: 17/887,725

(22) Filed: Aug. 15, 2022

Related U.S. Application Data

(60) Provisional application No. 63/235,910, filed on Aug. 23, 2021.

(51) Int. Cl.
| | |
|---|---|
| *H01Q 5/45* | (2015.01) |
| *H01Q 1/28* | (2006.01) |
| *H01Q 1/38* | (2006.01) |
| *H01Q 19/02* | (2006.01) |
| *H04B 7/0426* | (2017.01) |
| *H04B 17/11* | (2015.01) |
| *H04B 17/21* | (2015.01) |

(52) U.S. Cl.
CPC .............. *H01Q 5/45* (2015.01); *H01Q 1/286* (2013.01); *H01Q 1/38* (2013.01); *H01Q 19/022* (2013.01); *H04B 7/043* (2013.01); *H04B 17/11* (2015.01); *H04B 17/21* (2015.01)

(58) Field of Classification Search
CPC ............ H01Q 5/45; H01Q 1/286; H01Q 1/38; H01Q 19/022; H01Q 1/48; H01Q 3/46; H01Q 15/02; H01Q 19/062; H01Q 9/0442; H01Q 1/422; H01Q 1/42; H01Q 13/26; H01Q 19/06; H01Q 15/10; H01Q 15/0026; H04B 7/043; H04B 17/11; H04B 17/21

See application file for complete search history.

(56) References Cited

U.S. PATENT DOCUMENTS

| | | | | |
|---|---|---|---|---|
| 3,633,206 A | * | 1/1972 | McMillan | .......... H01Q 15/0026 343/781 R |
| 3,877,034 A | * | 4/1975 | Nelson | ................... H01Q 15/10 343/872 |

(Continued)

OTHER PUBLICATIONS

Weir, William B., "Automatic measurement of complex dielectric constant and permeability at microwave frequencies", Proceedings of the IEEE 62.1, 1974. pp. 33-36. (6 pages).

(Continued)

*Primary Examiner* — Bernarr E Gregory
(74) *Attorney, Agent, or Firm* — Lewis Roca Rothgerber Christie LLP

(57) ABSTRACT

An apparatus and related method are disclosed for compensation of an antenna and/or an antenna array located at a surface that experiences environmental conditions. The apparatus can include: an embedded compensation and/or calibration structure configured to be interrogated by an electromagnetic wave, to dynamically compensate for surface erosion, thermal expansion, and/or dielectric constant changes of a surface scattering antenna; and a processor configured to: receive measurements of the compensation and/or calibration structure to determine beam pointing for dynamically varying surface conditions and perform sensing and/or seeking observation.

21 Claims, 6 Drawing Sheets

(56) References Cited

U.S. PATENT DOCUMENTS

| | | | | |
|---|---|---|---|---|
| 4,091,388 | A | * | 5/1978 | Fiscus .................... H01Q 19/06 343/872 |
| 4,189,731 | A | * | 2/1980 | Rope ........................ H01Q 1/42 343/756 |
| 4,931,808 | A | * | 6/1990 | Lalezari ................. H01Q 13/26 343/753 |
| 5,184,141 | A | * | 2/1993 | Connolly ................. H01Q 1/42 343/705 |
| 5,408,244 | A | * | 4/1995 | Mackenzie ............ H01Q 1/422 343/873 |
| 5,463,404 | A | * | 10/1995 | Wall ..................... H01Q 9/0442 343/873 |
| 7,522,124 | B2 | * | 4/2009 | Smith .................... H01Q 15/02 343/873 |
| 7,595,765 | B1 | * | 9/2009 | Hirsch ................... H01Q 1/286 343/846 |
| 7,623,071 | B2 | * | 11/2009 | Ginn ........................ H01Q 3/46 343/872 |
| 7,719,694 | B1 | | 5/2010 | Gregoire |
| 8,957,808 | B2 | | 2/2015 | Ookawa |
| 9,488,601 | B2 | | 11/2016 | Ruege et al. |
| 9,705,611 | B1 | | 7/2017 | West |
| 2010/0109966 | A1 | * | 5/2010 | Mateychuk .............. H01Q 1/38 427/2.24 |
| 2011/0050248 | A1 | | 3/2011 | Bray et al. |
| 2014/0197848 | A1 | | 7/2014 | Gregoire et al. |
| 2022/0037798 | A1 | * | 2/2022 | Mohamadi ............... H01Q 1/48 |

OTHER PUBLICATIONS

TRL calibration cited at https://www.microwaves101.com/encyclopedias/trl-calibration. (7 pages), Copyright in the year 2022.

Nicolson, A. M., and G. F. Ross, "Measurement of the intrinsic properties of materials by time-domain techniques", IEEE Transactions on Instrumentation and Measurement, vol. IM-19, No. 4, Nov. 1970, pp. 377-382. (6 pages).

\* cited by examiner

FIG. 3d
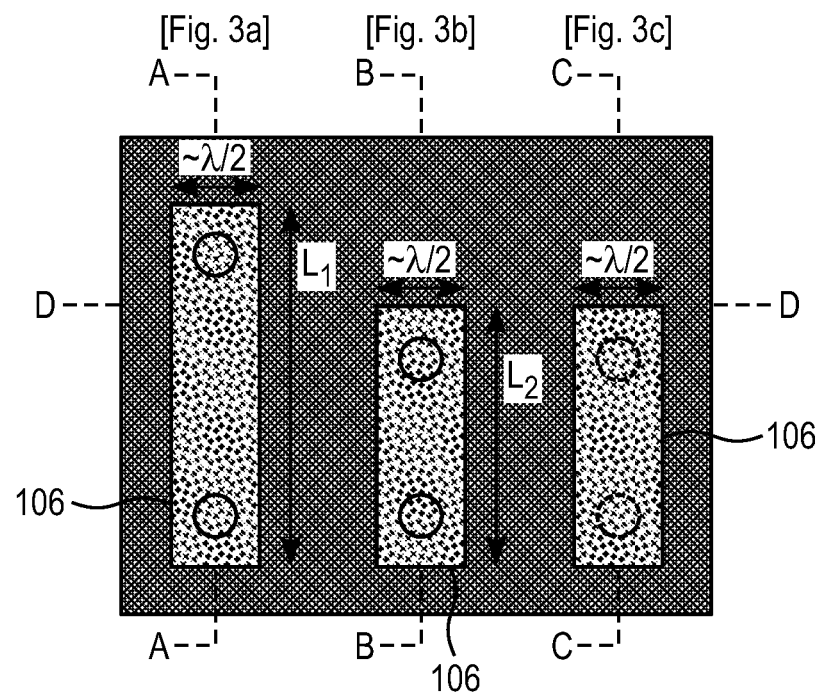
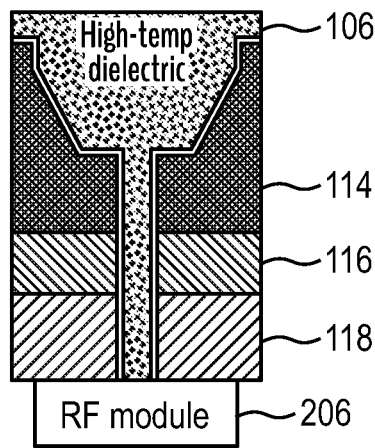
FIG. 3e

SURFACE ANTENNA COMPENSATION

CROSS-REFERENCE TO RELATED APPLICATIONS

This patent application is related to and claims the benefit of priority to U.S. Provisional Patent Application No. 63/235,910, filed on Aug. 23, 2021, the contents of which are hereby incorporated herein by reference in their entirety.

FIELD

The present disclosure relates to a method and apparatus for compensation of an antenna and/or an antenna array located at a surface that experiences environmental conditions.

BACKGROUND INFORMATION

Surfaces exposed to extreme environmental conditions, such as surfaces of moving vehicles, including supersonic or hypersonic vehicles, can experience extreme environmental conditions that cause erosion, thermal expansion, and temperature-based material changes to an externally mounted antenna. For traveling wave antennas where a beam angle is determined by material thickness and permittivity, the beam angle can change based on surface conditions and there is no current way to compensate for these changes to accurately determine beam pointing.

It is desirable for antennas to be located on an external surface of objects and vehicles to perform optimally. For high-velocity vehicles (e.g., supersonic or hypersonic vehicles), the antenna can be exposed to extreme temperature and mechanical environments that can, for example: (1) erode an outer layer of the antenna; (2) modify electromagnetic material properties of antenna materials; and (3) modify antenna geometry via thermal expansion. These conditions can make it difficult or impossible to use radomes or other protective coverings to shield the antenna from the environment. If left uncompensated, environmentally influenced modifications can invalidate the antenna's calibration and destroy an ability of the antenna to perform sensing and seeking missions.

Known calibration methods include setups involving TRL (thru, reflect, line), SOLT (short, open, load, thru), and other similar setups. These methods are used to calibrate test equipment and to de-embed for testing. These methods do not address erosion, thermal expansion, and/or dielectric changes that can modify antenna operation.

Known Nicholson-Weir-Ross parameter extraction techniques can determine complex dielectric constants and permeabilities from waveguide measurements. However, these techniques involve knowledge of electromagnetic material properties and do not provide dynamic measurements of: electromagnetic material properties; material thickness; material temperature; and thermal expansion. Known measurements are not obtained from a conformal surface under consideration as they involve an apparatus extending above the surface.

Known measurement techniques are described in the following documents which are hereby incorporated by reference in their entireties: Weir, William B. "Automatic measurement of complex dielectric constant and permeability at microwave frequencies." *Proceedings of the IEEE* 62.1 (1974): 33-36; and Nicolson, A. M., and G. F. Ross. "Measurement of the intrinsic properties of materials by time-domain techniques." *IEEE Transactions on instrumentation and Measurement* 19.4 (1970): 377-382.

Methods are also known to calibrate phased array antennas for differences in amplitude and phase caused by device variation and fabrication inconsistency. Exemplary methods use measurements of magnitude and phase at an output of each antenna element followed by creation of a calibration table to adjust input parameters. However, these methods do not dynamically compensate for erosion, thermal expansion, and dielectric changes that can modify antenna pointing.

Known calibration techniques are described in the following documents which are hereby incorporated by reference in their entireties: U.S. Pat. No. 8,957,808 B2, entitled Phased array antenna and its phase calibration method; and U.S. Pat. No. 9,705,611 B1, entitled Systems and methods for array antenna calibration.

An RF detection of erosion depth has been proposed using an external antenna with at normal or near-normal incidence, and measuring a phase of a reflected signal. This erosion detection method does not distinguish between erosion and dielectric constant changes nor does it distinguish temperature and resulting thermal expansion of antenna structures. The external antenna horn is located normal to the surface and would be unsuitable for an air vehicle, where it would be positioned in the air stream.

Known erosion detection techniques are also described in the following documents which are hereby incorporated by reference in their entireties: U.S. Pat. No. 9,488,601 B2, entitled Material erosion monitoring system and method; and U.S. Patent Publication No. 2011/0050248 A1, entitled Method and Apparatus for Nondestructive Measuring of a Coating Thickness on a Curved Surface.

Surface wave structures have also been proposed to allow conformal measurement of surface properties using EM waves, such as for vehicle measurements where characterization structures cannot be located in the air stream above the vehicle surface. Known methods have been used to detect cracks or damages in the vehicle surface, along with ice buildup. However, such methods do not calibrate for erosion, thermal expansion, and/or dielectric changes that can modify antenna operation.

Known measurement techniques involving measurement of surface properties are described in the following documents which are hereby incorporated by reference in their entireties: U.S. Patent Publication No. 2014/0197848 A1, entitled Removable surface-wave networks for in-situ material health monitoring; and U.S. Pat. No. 7,719,694 B1, entitled System and method of surface wave imaging to detect ice on a surface or damage to a surface.

No known system or method provides a comprehensive set of capabilities which include dynamic measurements of one or more of: electromagnetic material properties; material thickness; material temperature; and thermal expansion. Further, known systems do not obtain measurements from an apparatus that is applied to a conformal surface in such a manner that the apparatus does not extend above the surface.

SUMMARY

A system is disclosed which includes: a surface antenna having an aperture; a compensation and/or calibration system; and an electronic subsystem having a computer processor and a radio frequency (RF) module in operative communication and a compensation and/or calibration system, wherein the compensation and/or calibration system includes: plural compensation and/or calibration structures, each structure including: a dielectric layer covering at least a portion of the surface antenna aperture; a mode converter embedded within the dielectric layer; a carbon insulation layer; a refractory metal layer; a carbon-to-carbon layer positioned between the dielectric layer and the carbon insulation layer; an electronic subsystem surface interface; an oxide insulation layer positioned between the carbon-to-carbon insulation layer and the electronic subsystem surface interface; and a waveguide dielectric interconnecting the surface antenna aperture and the electronic subsystem surface interface.

An apparatus is disclosed for compensation of an antenna and/or an antenna array located at a surface that experiences environmental conditions, the apparatus comprising: an embedded compensation and/or calibration structure configured to be interrogated by an electromagnetic wave, to dynamically compensate for surface erosion, thermal expansion, and/or dielectric constant changes of a surface scattering antenna; and a processor configured to: receive measurements of the compensation and/or calibration structure to determine beam pointing for dynamically varying surface conditions.

A method is disclosed for compensation of an antenna and/or an antenna array located at a surface that experiences environmental conditions, the method comprising: embedding a compensation and/or calibration structure near the antenna and/or antenna array; interrogating the compensation and/or calibration structure by an electromagnetic wave, the interrogated compensation and/or calibration structure dynamically compensating for surface erosion, thermal expansion, and/or dielectric constant changes of the antenna or antenna array surface scattering; receiving measurements of the compensation and/or calibration structure to determine beam pointing for dynamically varying surface conditions; and performing sensing and/or seeking observation using outputs of the compensated and/or calibrated outputs of the antenna or antenna array.

BRIEF DESCRIPTION OF THE DRAWINGS

Other features and advantages of the present disclosure will become more apparent upon reading the following detailed description in conjunction with the accompanying drawings, wherein:

FIG. 3d shows an exemplary compensation and/or calibration structure top view cross-section at a height of mode converters illustrated with respect to cross-sectional views of the structures shown in each of FIGS. 3a-3c;

FIG. 3e shows an exemplary compensation and/or calibration structure side view illustration.

DETAILED DESCRIPTION

The present disclosure relates to a method and apparatus for compensation of an antenna and/or an antenna array located at a surface that may experience extreme environmental conditions. Exemplary embodiments provide new architectures of surface-mounted antennas that can be conformally located on a surface, such as a vehicle surface of an air, land or sea vehicle surface. Exemplary embodiments can outperform known architectures, such as those that use a radome or covering for protection.

An exemplary apparatus as disclosed herein provides embedded compensation and/or calibration structures near the antenna that can be interrogated by an electromagnetic wave to determine surface properties. An exemplary method uses measurements of the compensation structures (e.g., calibrated compensation structures) to determine accurate beam pointing for dynamically varying surface conditions, thus allowing a system to perform sensing and/or seeking observation with high accuracy.

As disclosed herein, a compensation and/or calibration system can enable dynamic corrections of vehicle and/or surface antenna performance during flight. Dynamic operation is desirable because surface antennas contain features at the vehicle surface that are highly sensitive to a dielectric constant, a dielectric height and erosion, and/or temperature. High-velocity vehicles encounter extremes in both temperature and erosion which can lead to changes in an antenna pointing angle. If the actual pointing angle changes with respect to expectation, and these changes are uncompensated, then the vehicle cannot perform its mission because it will misinterpret positions of targets.

Figure 1:
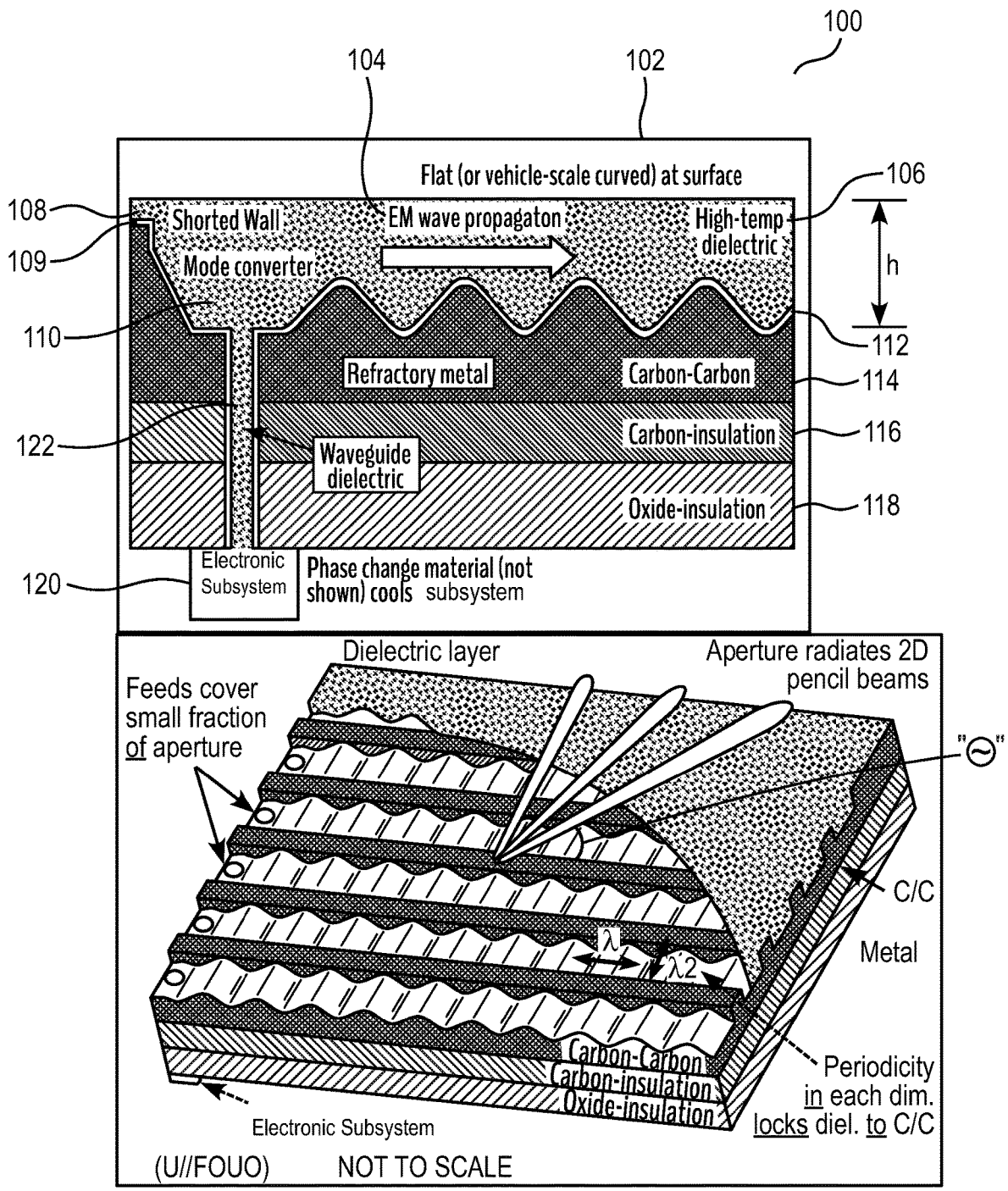
FIG. 1 shows an exemplary embodiment of electronic subsystem associated with a vehicle surface, and a surface antenna compensation and/or calibration system.

The FIG. 1 exemplary embodiment shows a vehicle having compensation information related to a dielectric constant, dielectric height "h", and periodicity of modulations, which information can change as a result of, for example, high temperatures and erosion present at a surface of a high-velocity vehicle and thereby change radiation angles of the antenna which can disrupt vehicle operation. In FIG. 1, an exemplary configuration of a surface scattering antenna 100 includes a pointing angle defined as follows:

$$\sin\theta = n_0 - \frac{\lambda}{p} = n_0 - \frac{c}{pf}$$

In the foregoing equation, the pointing angle is θ, and this is impacted by an index $n_0$, a spatial periodicity of modulation, p, a frequency f, and wavelength, λ, wherein λ is related to frequency as λ=c/f where c is the speed of light.

The index "$n_0$" is the "equivalent mode index" of the propagating surface wave. An "equivalent mode dielectric constant" is related to the dielectric constant, with index "$n_0$"=sqrt (dielectric constant). The surface wave mode contains electromagnetic fields that are spread between the high temperature dielectric, such as the dielectric represented by a dielectric layer 106 in FIG. 1; the air above the aperture; and also the interaction of the surface wave mode with reflections due to any refractory metal layer located below the dielectric. Because the interaction occurs with multiple materials, the "equivalent mode index" as referenced herein represents an average material property of the mode it sees. The "equivalent mode index" can be considered the material index for assessing a propagation velocity of a plane wave in the material, which velocity can thereby be equal to that of the surface wave mode, taking into account the geometry.

The dielectric constant is a constant of the high-temperature dielectric material described herein, as this material experiences the largest changes with temperature in exemplary embodiments. Changes to a dielectric constant or periodicity in flight due to extreme temperatures or erosion can cause angle discrepancies. An exemplary compensation system as disclosed herein can determine, or calculate, an amount of erosion along with changes to periodicity and a dielectric constant to allow accurate calculation of the radiation angle.

FIG. 1 illustrates a system which includes a surface antenna having an aperture; a compensation and/or calibration system containing plural compensation and/or calibration structures, each structure including: a dielectric layer covering at least a portion of the surface antenna aperture, a mode converter embedded within the dielectric layer; a carbon insulation layer; a refractory metal layer; a carbon-to-carbon (C-to-C, or C/C) layer positioned between the dielectric layer and the carbon insulation layer; a an electronic subsystem surface interface; an oxide insulation layer positioned between the carbon-to-carbon insulation layer and the electronic subsystem surface interface; and a waveguide dielectric interconnecting the surface antenna aperture and the electronic subsystem surface interface; and an electronic subsystem having a computer processor and a radio frequency (RF) module in operative communication with the compensation and/or calibration system.

In FIG. 1, the external surface 102 can be, for example, a flat or vehicle-scale curved, surface. The lower half of FIG. 1 is a perspective of the cross-sectional view shown in the upper half of FIG. 1. Electromagnetic wave propagation 104 is from left to right in the exemplary illustration across the dielectric layer 106 which can cover an entire antenna aperture radiating, for example, any number of 2-dimensional pencil beams.

The exemplary pencil beams in FIG. 1 show 1-dimensional steering. The aperture can radiate a beam in any direction for theta and phi, (in spherical coordinates). FIG. 1 shows three beams of the same azimuth but those skilled in the art will appreciate that any azimuth and elevation angles will be feasible and can be selected.

The dielectric layer 106 can be a relatively high temperature dielectric abutting a shorted wall 108. The dielectric material is, for example, capable of being heated to high temperatures, such as >1000 C without decomposing or suffering damage. A mode converter 110 is included within the dielectric.

A refractory metal layer 112 and a carbon-to-carbon (C/C) layer 114 can be provided between the dielectric layer 106 and an exemplary a carbon insulation layer 116. The refractory metal layer 112 uses the RF signal from an RF module to reflect at the metal interface and return without being transmitted via a waveguide dielectric 122.

An exemplary embodiment can include additional (e.g., stacked) insulating layers. For example, the FIG. 1 embodiment includes an oxide insulation layer 118 to insulate an electronic subsystem 120 and/or an electronic subsystem surface interface which receives EM that has been received by the antenna surface and directed to the electronic subsystem via the waveguide dielectric 122. Those skilled in the art will appreciate that the electronic subsystem is an electronic system, such as a radar, seeker or other electronic subsystem, that can be optionally mounted on or within a vehicle (e.g., aircraft, unmanned aerial vehicle (UAV), missile or any airborne device). The waveguide dielectric, or waveguide dielectrics if two or more such waveguide dielectrics are included, thereby interconnects the surface antenna aperture and RF received therein as electromagnetic energy to the surface interface.

The subsystem 120 (e.g., radar, or radar/seeker) can be configured in any known manner to receive electromagnetic energy (e.g., RF energy) and perform any desired seeking and/or radar function or other function. The subsystem can for example, include a computer processor and execute a software program stored on a non-transitory computer readable medium configured as a computer readable medium storing program code for performing data processing. A person having ordinary skill in the art will appreciate that embodiments of the disclosed subject matter can be practiced with one or more modules in a hardware processor device with an associated memory. A hardware processor device as discussed herein can be a single hardware processor, a plurality of hardware processors, or combinations thereof.

In an exemplary embodiment, control signals, processing algorithms, artificial intelligence capability and so forth can be provided to or from the electronic subsystem using any suitable local or remote database configuration. Suitable configurations and storage types will be apparent to persons having skill in the relevant art.

The exemplary computing device of the electronic subsystem can include a communications interface. The communications interface can be configured to allow software, control signals and data to be transferred between the computing device and external devices. Exemplary communications interfaces can include a modem, a network interface (e.g., an Ethernet card), a communications port, a PCMCIA slot and card, etc. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, etc.

The waveguide dielectric 122 as shown in the perspective view can be represented as one or more feeds, located within a relatively small fraction of the aperture. The waveguide dielectric 122 can be the same, or different material relative to the material of which dielectric 106 is formed. Exemplary waveguide dimensions are shown in the perspective as $\lambda$ and $\lambda/2$ where a periodicity in each dimension locks the dielectric to the carbon-to-carbon (C/C) layer.

As mentioned, the FIG. 1 surface scattering antenna system includes an embedded compensation and/or calibration system to compensate environmental influence on radiation angle. The FIG. 1 embodiment can include an associated electronic subsystem, such as a seeker system, a radar system or other electronics, having a computer processor and a radio frequency (RF) module in operative communication with the compensation and/or calibration system as will be described herein.

Figure 2:
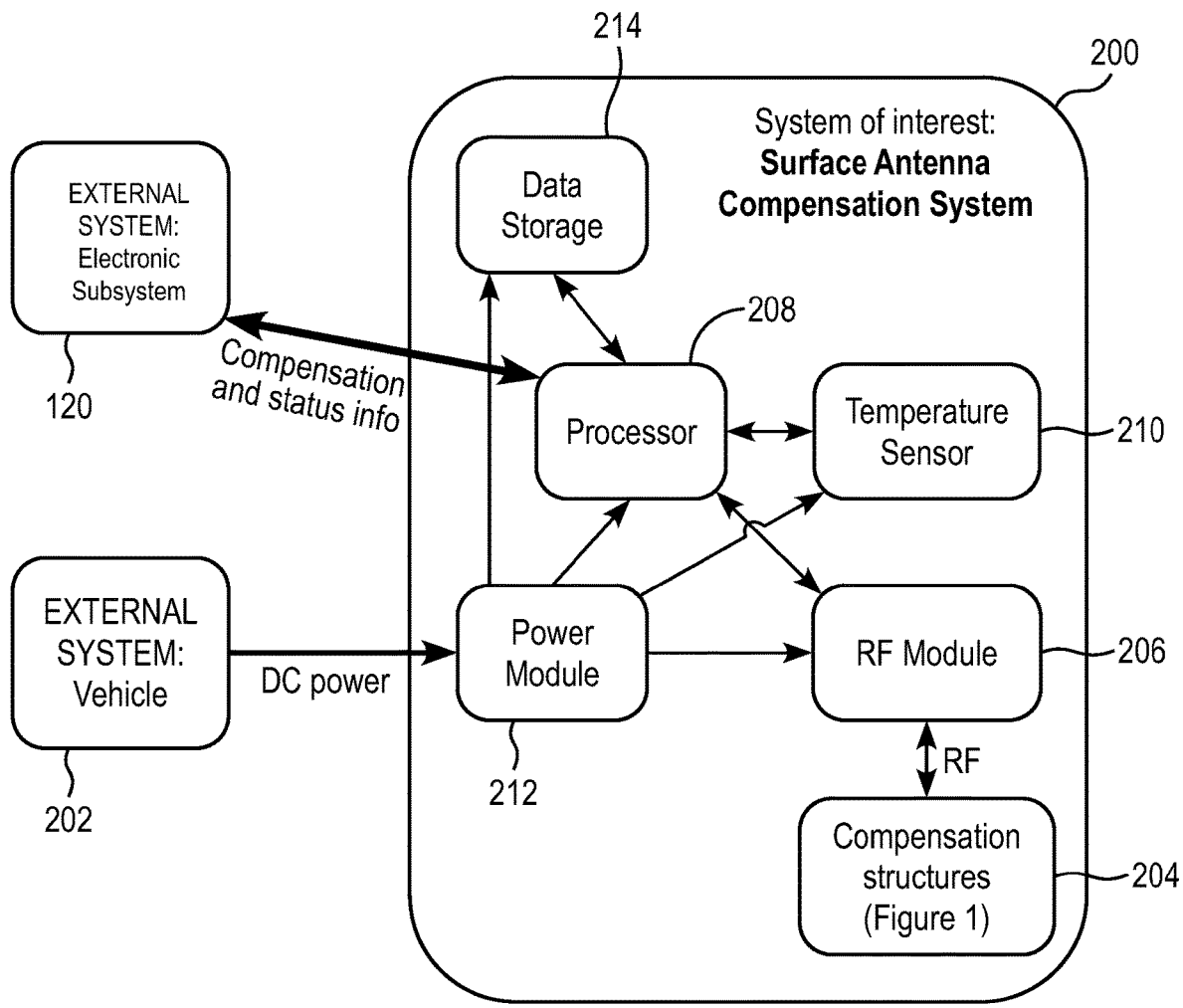
FIG. 2 shows an exemplary system block diagram of a surface antenna compensation and/or calibration system.

FIG. 2 shows details of an exemplary system block diagram for a physical compensation and/or calibration system 200 of a surface antenna such as that of FIG. 1.

Referring to FIG. 2, the exemplary surface antenna compensation and/or calibration system contains several components, such as embedded compensation and/or calibration structures 204, each of which can be a compensation and/or calibration structure as described with respect to FIG. 1 and/or FIGS. 3a-3e. For example, one or more such structures can be located at a surface of an external system such as a vehicle 202. These structures can be configured to be interrogated with RF electromagnetic waves at one or more frequencies within the operating frequency range of the antenna to dynamically compensate for surface erosion, thermal expansion, and/or dielectric constant changes. The compensation and/or calibration system can be connected to an RF module 206 via transmission lines that allow RF signals to be input into the structures and then measured on an output. A magnitude and phase of these RF signals can provide information about surface properties.

The compensation and/or calibration structures can be configured with the same set of materials as the surface antenna to, for example, simplify manufacturing since the same manufacturing process can be used. This can provide more accurate calibrations since the surface antenna and calibration structures have the same material "stackup" (i.e., such as the material stackup shown in FIG. 1). However, it is possible to use compensation and/or calibration structures of different materials and stackup as long as the relative impact of extreme conditions (e.g., higher temperature and/or airflow conditions) on the compensation and/or calibration structures vs. the antenna are known or can be predicted.

The apparatus for compensation and/or calibration of an antenna and/or antenna array can include a computer processor 208 configured to receive measurements of the compensation and/or calibration structure(s) to determine beam pointing for dynamically varying surface conditions, and to perform desired functions, such as of: sensing and/or seeking observation within the electronic subsystem.

FIGS. 3a-3e shows details of exemplary compensation and/or calibration structures of the compensation and/or calibration system 204 of FIG. 2.

In FIGS. 3a-3e, exemplary embodiments of the compensation and/or calibration system are shown, and can include structures configured to be the same as that of the antenna which is being compensated, where an exemplary material stackup shown in FIGS. 3a, 3b, 3c, and 3e has the same materials and thickness as the materials of the antenna. As such material compositions and thicknesses and order are, for example, the same in the compensation and/or calibration structures, and the antenna. The exemplary dielectric does not have modulations or periodicity. The compensation and calibration structures can be fabricated at the same time as the antenna and on the same material article so that all of the layers can have the same thicknesses and properties.

A high temperature dielectric can exist at a top surface where temperature is highest. Exemplary materials include hafnium silicate, boron nitride, aluminum oxide, hafnium oxide, calcium titanate, calcium zirconate, or any suitable material. The dielectric can, for example, be on the order of 0.1-10 mm thick, or lesser or greater depending on the frequency of operation.

An electrically conductive layer is placed below the high-temp dielectric in order to shield EM waves from the carbon-to-carbon (C—C) or insulating layers. Exemplary materials of metal include refractory metals (e.g., tungsten, niobium, tantalum, molybdenum, zirconium, rhodium, platinum), refractory metal alloys, nickel superalloys, or certain diborides (e.g. $ZrB_2$), carbides, or nitrides that are electrically conductive at elevated temperatures.

A structural layer (e.g., an aeroshell, such as, for example a carbon-carbon (C—C) aeroshell) is located below the electrically conductive layer. This layer can be, e.g. materials which include carbon (C) and/or silicon(S) such as C/C, C/SiC, SiC/SiC, and/or nickel superalloy, refractory metal, or refractory metal alloy or any suitable material.

One or more thermally insulating layers can be placed below the C—C aeroshell in order to reduce the temperature to a desired level. More than one may be desired depending on the expected hot and cold side temperatures. Examples include porous carbon insulation and porous oxide insulation (e.g. Cal-carb, Zircar, min-K). Based on the surface temperature, one or more different insulating layers can be included. The composition of the insulating layers can be chosen based on the surface temperature and the desired temperature drop desired and/or needed (e.g., specified).

The insulation layers are not intended to interact with the electromagnetic fields. The waveguides are associated, for example with metal, by depositing a metal surface as the layer 112 below the high temperature dielectric to confine (e.g., reflect) the EM waves.

The waveguide(s) 122 can be used to connect between the RF module and the top surface. A mode converter launches a surface wave into a grounded dielectric. Grounded-dielectrics are known to support surface waves, and the mode converter can use a quarter-wave shorted reflector to launch in a forward direction.

Figure 3A:
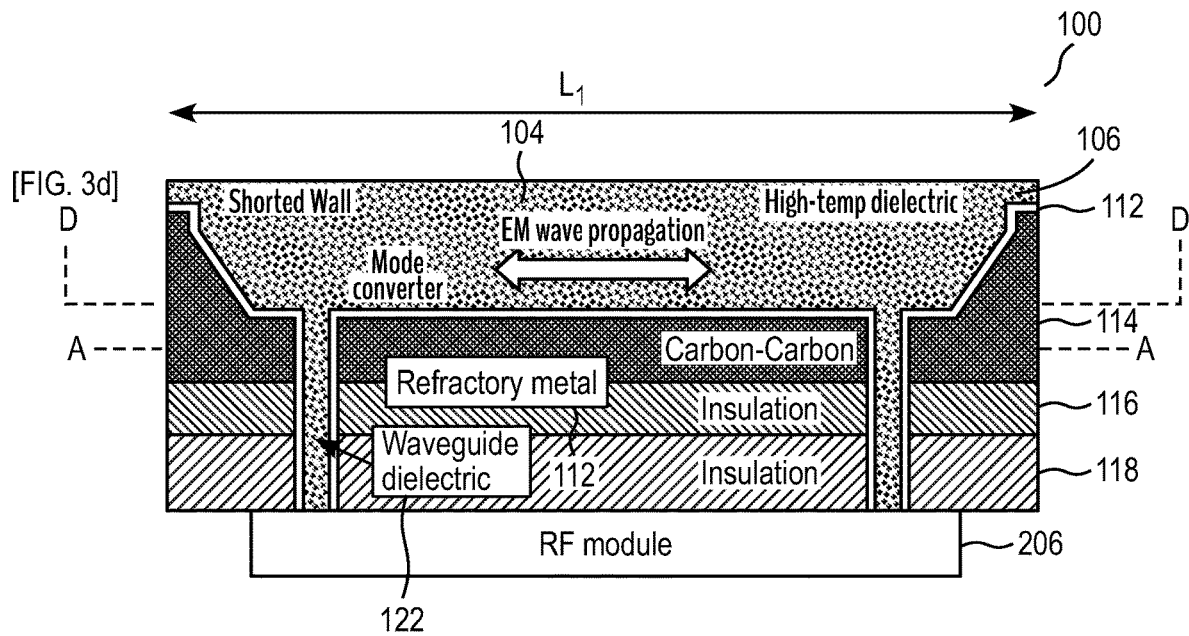
FIG. 3a shows an exemplary compensation and/or calibration structure in a cross-section side view illustration.

In the exemplary embodiments of FIGS. 3a-3e, an exemplary compensation and/or calibration structure has three different, individual compensation/calibration structures which collectively perform compensation and/or calibration via the set of three waveguides (shown in FIG. 3d). Each of the three waveguides is a calibration and/or compensation structure, but the set of all three can be used for calibrated compensation, which each have two RF connections to the RF module. In each case, exemplary sections are approximately one wavelength in width. The connections to the RF module are made by waveguides that transmit RF signals through the insulation layers and to the dielectric top surface.

FIG. 3a shows a side view of a first exemplary compensation structure section. This section allows transmission of a surface wave along the dielectric. Surface waves are propagation modes that remain bound to a grounded dielectric structure. The phase velocity of propagation is dependent on dielectric height and dielectric constant. This section is a length L1 which is, for example, in a range of 0.5-10 wavelengths, or lesser or greater.

Figure 3B:
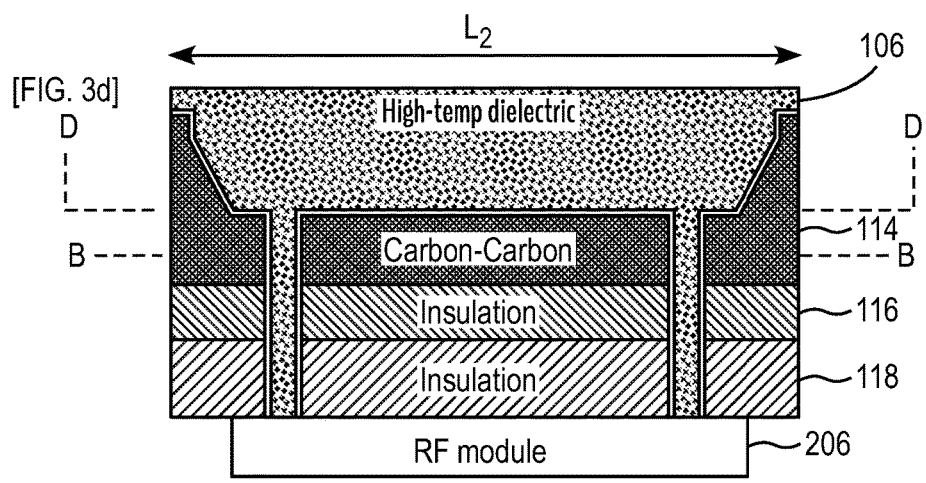
FIG. 3b shows an exemplary compensation and/or calibration structure in a cross-section side view illustration.

FIG. 3b shows side view of a second compensation structure. This structure can have a same geometry as the first section, but is length L2 instead of L1. L2 is, for example, between 0.5-10 wavelengths, or lesser or greater but should be different from L1 by at least 0.1 wavelength (e.g., at least 0.5 wavelengths). The compensation structures can thereby perform, for example, TRL-type de-embedding via two different through waveguides, along with an additional calibration structure configured as a reflection-based structure for calibration described herein with respect to FIG. 3c. Operation of a system incorporating different length (L1/L2) structures is known with respect to TRL calibration (see, e.g., an Internet page as follows:
https://www.microwaves101.com/encyclopedias/trl-calibration).

Figure 3C:
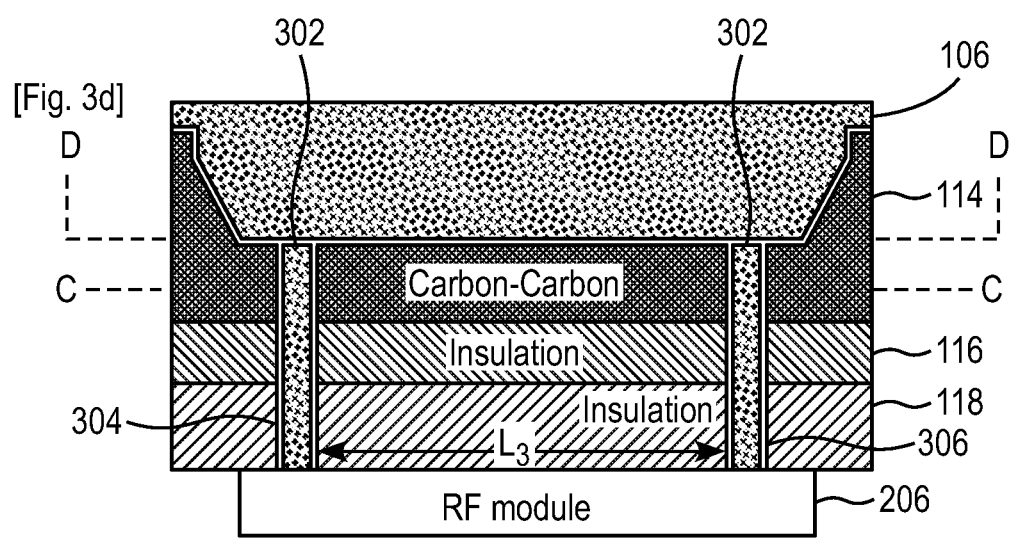
FIG. 3c shows an exemplary calibration structure in a cross-section side view illustration.

FIG. 3c shows an exemplary calibration structure having metal 302 covering the waveguides 122 at an interface between the waveguide and the high temperature dielectric. This causes the RF signal from the RF module to reflect at this interface and return without transmission. This is used as a calibration of the waveguide and RF module to account for changes in these layers that may occur during flight. Those skilled in the art will appreciate that the lengths L1 and L2, shown in FIGS. 3a and 3b, respectively, are not the separations between the waveguides in those structures. In each case, L1 and L2 is a compensation structure length which can be greater than the waveguide separation. The exemplary FIG. 3c calibration structure is shown with two waveguides separated by L3. However, it can have a different separation difference, or it can also be configured with a single waveguide to provide a calibration function.

FIG. 3d shows a cross-sectional top view along cross-section lines D-D in each of the FIG. 3a, 3b, 3c cross-sections: A-A, B-B and C-C. The exemplary compensation and/or calibration structures include the devices of FIGS. 3a, 3b, and 3c to perform an exemplary compensation and/or calibration in a manner as described herein. A FIG. 3d top view from above the compensation and calibration structures of FIGS. 3a-3c would see only the dielectric because it fully covers the carbon-to-carbon (C—C) layer and the mode converters. Therefore this cross-sectioned view of FIG. 3d is a cross-section view cuts through the mode converter layer of the waveguide dielectrics 122.

In FIG. 3d the compensation/calibration structures are all placed in parallel and arranged horizontally. However, other arrangements and orientations can be used as will as appreciated by those skilled in the art, provided the structures remain isolated from each other (e.g., separation greater than 0.5 wavelength, or lesser or greater as desired). In the FIG. 3c calibration structure, the waveguides exist below the dielectric for this cross section due to the added refractory metal 302 that separates them from the dielectric layer 106.

In an exemplary embodiment, the compensation system can be located as close as possible to a vehicle's surface antenna so that vehicle conditions are the same on the compensation structure as the antenna.

FIG. 3e shows an exemplary optional compensation and/or calibration structure that can be included in addition to other structures or in replacement. This structure has the same waveguide and mode converters as FIG. 3b along with the same insulation layers, conductive layer, and high temperature dielectric. In this embodiment, only a single waveguide is present and the RF system measures reflection from this compensation structure.

Exemplary embodiments can interface with an RF module. The RF module can be configured to excite an RF signal into the calibration structure, and to measure the magnitude and phase of responses. This module can be a known printed circuit board (PCB) populated with commercial-off-the-shelf RF components for excitation and measurement of RF signals. The insulation layers in the compensation structures can be selected to reduce the temperature to levels where COTS (commercial-off-the-shelf) circuitry is usable.

The RF module can be coupled to the waveguides in the compensation circuit using known transmission lines (e.g., microstrip, stripline, coaxial cable, rectangular waveguide, circular waveguide, ridged waveguide, or other suitable transmission lines) to waveguide converters.

Magnitude and phase results from the RF module are sent to the processor such as FIG. 2 processor 208 with attendant power module 212 and data storage 214 which performs the calibration. In an exemplary embodiment, for each compensation structure, 2-port complex S-parameters are measured (S11, S12, S21, S22).

Returning to FIG. 2, the exemplary system as shown can include a temperature sensor 210 located at a surface in contact with the surface antenna, and/or within one or more of the compensation and/or calibration structures. The temperature sensor 210 can be included as shown in the exemplary embodiment at a vehicle surface to provide a measurement of the temperature at this location. Alternatively, the temperature sensor can be inside one or more of the layers or at the interface of two layers. In such a case where the temperature sensor is embedded, a model of heat conduction through the entire structure can be used to estimate the temperature (or temperature distribution) within the compensation structures based on the temperature of the temperature sensor.

Alternatively there can be two or more temperature sensors, each of which can be at the surface of the vehicle, inside one or more of the layers, or at the interface of two layers. In this case, a local heat flux through the structure can be measured, assuming knowledge and/or characterization of the thermal conductivity. This, optionally coupled with a model of heat conduction through the entire structure, can be used to estimate the temperature or temperature distribution within the compensation structures. The temperature sensor can alternately be a resistance temperature detector (RTD), thermocouple, optical or infrared pyrometer, thermistor, transistor, or other suitable sensor which is selected to survive high temperatures in which the vehicle will operate.

The FIG. 2 processor 208 can, for example, be a commercial off-the-shelf (COTS) processing device such as a microcontroller, FPGA, central processing unit, or other suitable device. The processor pulls information from the data storage 214, the temperature sensor 210, and the RF module 206, and then calculates a current dielectric height, dielectric constant, and thermal expansion. These values are communicated to a vehicle electronic subsystem so that it can calculate accurate pointing angles.

The data storage 214 can be a COTS data storage electronics (e.g., flash memory, hard disks and so forth) used to store measured data about the compensation structures.

The FIG. 2 system can include a power module in operative communication with the computer processor. The exemplary power module 212 can, for example, include COTS power electronics devices to receive a DC (and/or AC) voltage from the vehicle, convert that voltage to desired or required levels of each subsystem, and deliver sufficient current levels to each subsystem.

Figure 4:
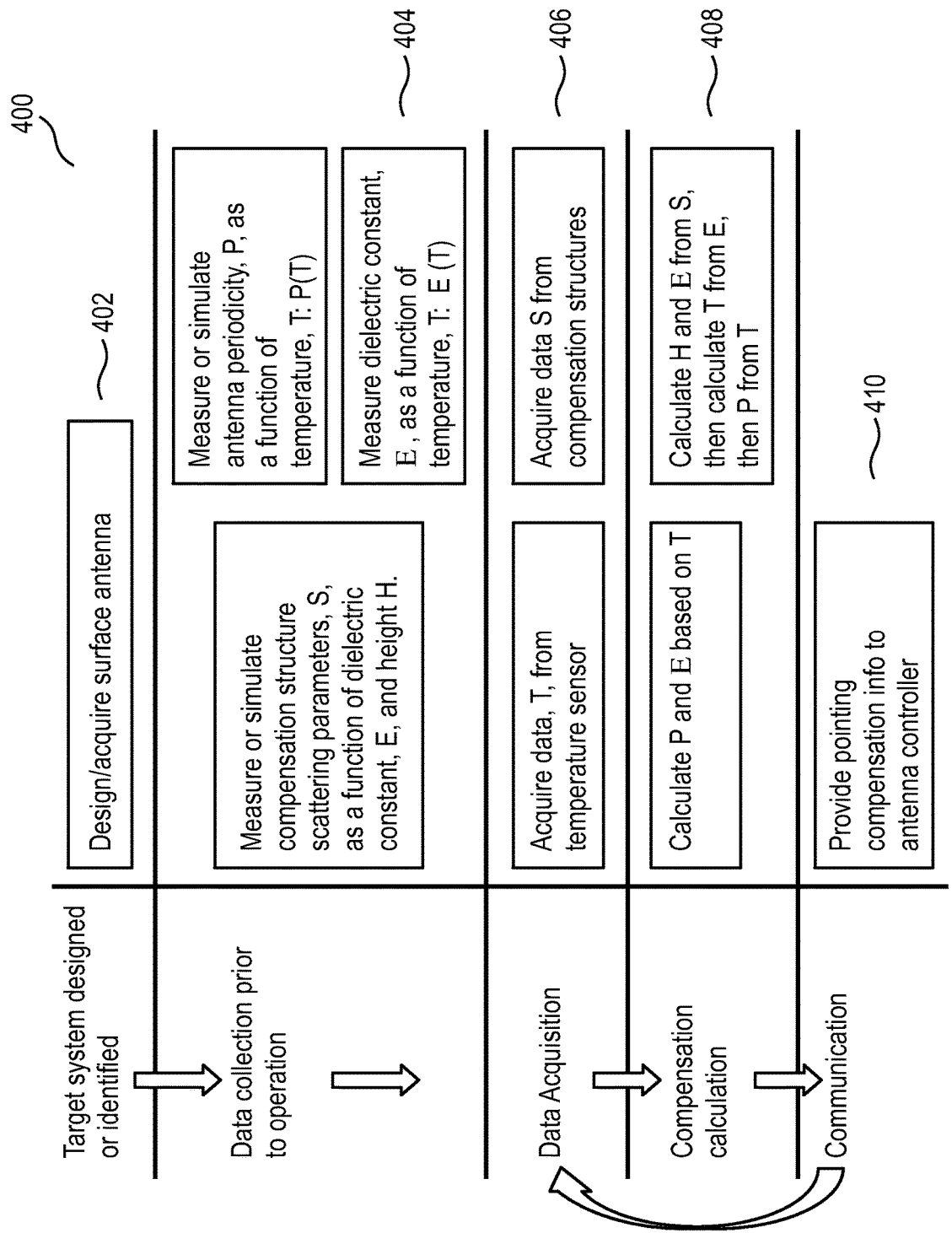
FIG. 4 shows an exemplary block diagram of a method for surface antenna compensation.

Referring to FIG. 4, a multi-step method (400) can be used to compensate the surface antenna using the compensation system shown therein, whereby a surface antenna is identified for compensation (402). An exemplary embodiment uses a physical structure that is as closely matched as possible to the system that is being compensated. In such an exemplary embodiment, the surface antenna can be identified and this identification used in designing and configuring the compensation system.

In exemplary embodiments, data collection (404) prior to operation can be preferred. For example, to accurately run a compensation algorithm, it can be desirable to simulate or measure multiple aspects of the compensation structure. These simulations and/or measurements provide information about how physical changes to the structure impact the measured responses. Exemplary embodiments can measure or simulate compensation structure scattering parameters, S, as a function of dielectric constant, $\varepsilon$, and height, H. Such measurements can provide information about how erosion of the dielectric (changes in H) impacts scattering parameters. Similarly the measurements can provide information about how changes in dielectric constant impact the scattering parameters.

Exemplary embodiments can measure or simulate antenna periodicity, P, as a function of temperature, T: P(T). Increasing temperatures at a vehicle surface during operation will increase thermal expansion of the dielectric that will change periodicity P on the antenna. Measurement of thermal expansion as a function of temperature allows appropriate P to be utilized by a vehicle electronic subsystem.

Exemplary embodiments can measure a dielectric constant, $\varepsilon$, as a function of temperature, T: $\varepsilon(T)$. Dielectric constant impacts antenna pointing and will also create changes in the scattering parameters of the compensation structures.

Data acquisition (406) can be performed to provide the compensation described herein, using, for example, a temperature sensor which can either be selected/designed and/or configured to continuously transmit temperature information to the processor, or it can be selected, designed and/or configured to respond to queries. Scattering parameters can be measured by collecting S-parameter data (S11, S12, S21, S22) from each of the compensation structures. The RF module can excite these signals and read magnitude and phases of the responses. This data is then provided to the processor.

A compensation calculation (408) can be performed using the acquired data. Unknowns for calculation are dielectric height, dielectric constant, and thermal expansion over frequencies of operation of a vehicle electronic subsystem. The compensation system can have several independent measurements:

Structure 1 transmission: S12=S21

Structure 2 transmission: S12=S21

Structure 1 and structure 2 reflection: S11=S22

Temperature sensor measurement: T

Structure 3 calibration measurement: to calibrate results of structures 1 and 2.

The foregoing measurements, in reference to the stored data obtained prior to operation, can be used to calculate dielectric height, constant and expansion using a least squares fit (or other minimization technique) to provide a best estimate of the unknown properties. For example, a TRL calibration can be performed using the disclosed structure(s) with any known calibration process, including but not limited to that described on the Internet page https://www.microwaves101.com/encyclopedias/trl-calibration dated Aug. 2, 2022, the disclosure of which is hereby incorporated by reference in its entirety wherein a TRL calibration process includes selecting a TRL line standard for each designated frequency band with calculated frequency crossover points, and calculating quarterwave line lengths for each center frequency taking effective dielectric constants into account. After this calibration, an interpolation can be performed to go from the TRL calibration to an estimate of dielectric height, dielectric constant, and periodicity as those skilled in the art will appreciate.

Compensation results can be communicated (410) via transmission to the vehicle electronic subsystem. At any specified time interval (e.g., 100 microseconds, or shorter or longer) the acquisition-calculation-communication process can be repeated to update the compensation as a vehicle continues on its trajectory and surface conditions are changed.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A system comprising:
a surface antenna having an aperture;
a compensation and/or calibration system; and
an electronic subsystem having a computer processor and a radio frequency (RF) module in operative communication and a compensation and/or calibration system, wherein the compensation and/or calibration system includes:
plural compensation and/or calibration structures, each structure including:
a dielectric layer covering at least a portion of the surface antenna aperture;
a mode converter embedded within the dielectric layer;
a carbon insulation layer;
a refractory metal layer;
a carbon-to-carbon (C-to-C) layer positioned between the dielectric layer and the carbon insulation layer;
an electronic subsystem surface interface;
an oxide insulation layer positioned between the carbon-to-carbon insulation layer and the electronic subsystem surface interface; and
a waveguide dielectric interconnecting the surface antenna aperture and the electronic subsystem surface interface.

2. The system according to claim 1, wherein:
each structure of the compensation and/or calibration system is composed of a same set of materials as from the surface antenna, wherein the surface antenna is mounted on a vehicle which includes the electronic subsystem.

3. The system according to claim 1, wherein:
each structure of the compensation and/or calibration system is composed of a different set of materials as used in the surface antenna.

4. The system according to claim 1, comprising:
a temperature sensor located at a surface in contact with the surface antenna, and/or within one or more of the compensation and/or calibration structures.

5. The system according to claim 1, comprising:
a data storage and a power module in operative communication with the computer processor.

6. Apparatus for compensation of an antenna and/or an antenna array located at a surface that experiences environmental conditions, the apparatus comprising:
an embedded compensation and/or calibration structure configured to be interrogated by an electromagnetic wave, to dynamically compensate for surface erosion, thermal expansion, and/or dielectric constant changes of a surface scattering antenna; and
a processor configured to:
receive measurements of the compensation and/or calibration structure to determine beam pointing for dynamically varying surface conditions.

7. The apparatus according to claim 6, in combination with:
an antenna and/or antenna array located on an exterior surface of a vehicle configured to travel with a velocity which will cause exterior surface temperature to exceed an interior surface temperature of the vehicle.

8. The apparatus according to claim 7, wherein the compensation and/or calibration structure is connected to an RF module via transmission lines that allow RF signals to be input into the structure and then measured on an output, a magnitude and phase of an output signal providing information about the surface properties.

9. The apparatus according to claim 8, the compensation and/or calibration structure is formed of a same materials as the antenna and/or antenna array.

10. The apparatus according to claim 8, comprising:
a dielectric at an outermost top of the exterior surface where temperature is highest in operation.

11. An apparatus according to claim 10, comprising:
at least one or more additional C-to-C insulating layers below the exterior surface; and
an electrically conductive layer placed below the dielectric to shield electromagnetic waves from the at least one or more additional C-to-C insulating layers.

12. An apparatus according to claim 11, comprising:
a structural layer and/or aeroshell below the electrically conductive layer.

13. An apparatus according to claim 12, comprising:
at least one or more waveguides connected between an RF module and the top of the exterior surface.

14. An apparatus according to claim 13, comprising:
a mode converter for launching a surface wave into the dielectric, the dielectric being at ground potential.

15. An apparatus according to claim 13, wherein the compensation and/or calibration structure comprises:
three different sections which each have two RF connections to an RF module, each section being approximately one wavelength in width.

16. An apparatus according to claim 15, comprising:
a first compensation structure section for transmission of a surface wave along the dielectric, and having a length L1;
a second compensation section having a compensation structure section having a same geometry as the first compensation structure section, and having a length L2 different from L1; and
a calibration structure section having a metal covering the one or more waveguides at an interface between the one or more waveguides and the dielectric.

17. An apparatus according to claim 7, comprising:
an RF module configured to excite an RF signal into the compensation and/or calibration structure and to measure a magnitude and phase of an output signal response.

18. An apparatus according to claim 7, comprising:
a temperature sensor located at the exterior surface of the vehicle.

19. Method for compensation of an antenna and/or an antenna array located at a surface that experiences environmental conditions, the method comprising:
embedding a compensation and/or calibration structure near the antenna and/or antenna array;
interrogating the compensation and/or calibration structure by an electromagnetic wave, the interrogated compensation and/or calibration structure dynamically compensating for surface erosion, thermal expansion, and/or dielectric constant changes of the antenna and/or antenna array surface scattering;
receiving measurements of the compensation and/or calibration structure to determine beam pointing for dynamically varying surface conditions; and
performing sensing and/or seeking observation using compensated and/or calibrated outputs of the antenna or antenna array.

20. A method as claimed in claim 19, comprising:
simulating and/or measuring multiple aspects of the compensation and/or calibration structure, the multiple aspects including:
one or more structure scattering parameters S, as a function of dielectric constant $\varepsilon$, and height H;
antenna periodicity P, as a function of temperature T: P(T); and/or
dielectric constant $\varepsilon$, as a function of temperature T.

21. A method as claimed in claim 19, comprising:
establishing a desired time interval for repeating an acquisition-calculation-communication to update a compensation and/or calibration of the antenna and/or antenna array output.

* * * * *